Figure 1:
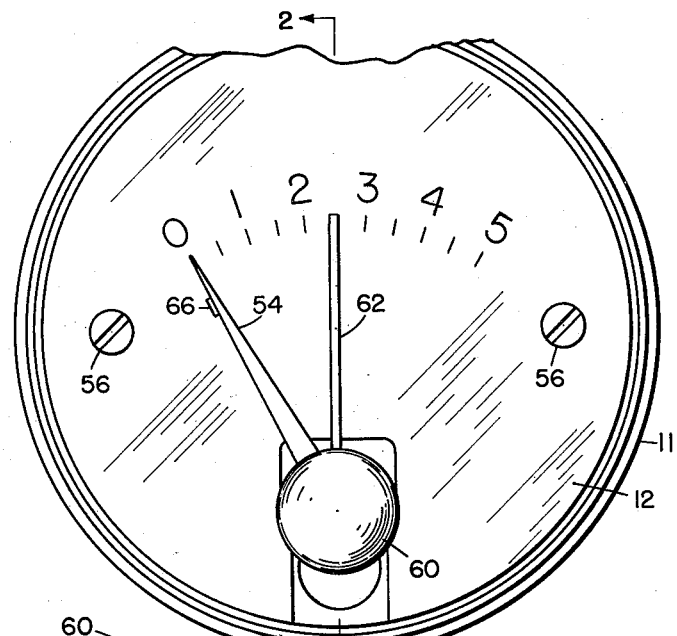

June 25, 1963 — W. W. HASTINGS — 3,094,876

DIFFERENTIAL PRESSURE GAUGE

Filed Jan. 18, 1960

INVENTOR.
WARREN W. HASTINGS

United States Patent Office 3,094,876
Patented June 25, 1963

3,094,876
DIFFERENTIAL PRESSURE GAUGE
Warren W. Hastings, Rochester, N.Y., assignor, by mesne assignments, to American Radiator & Standard Sanitary Corporation, New York, N.Y., a corporation of Delaware
Filed Jan. 18, 1960, Ser. No. 3,194
1 Claim. (Cl. 73—407)

The present invention relates to differential pressure gauges, and more particularly to an improved diaphragm-operated differential pressure gauge, which is particularly designed for use in systems where the line pressure is high but the differential in pressure is fairly low.

Differential pressure gauges are commonly used for measuring the rate of fluid flow, and the pressure drop between two points in a pressure system, as for example, at opposite sides of a filter, a valve, a heat exchanger, etc. Usually the requirement is to measure a fairly low differential pressure in a pressure system that maintains a reasonably high static pressure. The means for actuating the indicator of the gauge may comprise a single diaphragm, multiple diaphragms, or bellows. The pressure from one source is supplied to one side of the diaphragm or bellows, and the pressure from the second source is supplied to the other side of the diaphragm or bellows. The motion of the diaphragm or bellows is proportional to the pressure difference between the two sources, and is used to actuate the indicator of the gauge.

Various types of differential pressure gauges are known. Differential pressure gauges, such as are used for airspeed indicators and manifold pressure gauges in aircraft, for example, are commonly made with a sealed casing that contains the dial, the pointer, and the pointer-actuating mechanism. Where a diaphragm is used, one pressure is applied to the interior of a diaphragm chamber and the second pressure is applied to the interior of the sealed casing. These gauges are satisfactory where the static pressure is less than thirty pounds per square inch maximum; but for pressures above this value, because of the difficulty of sealing the casing and of sealing the window in the casing through which the indicator can be viewed, the sealed casing construction is impractical.

For a universal gauge where the static or line pressure is higher than thirty pounds per square inch, the sealing of the diaphragm housing against high pressure while transferring motion from the diaphragm through the sealed housing to the indicator poses a difficult problem.

In one common form of high pressure differential gauges, a crank arm is mounted in the diaphragm housing in direct contact with the diaphragm. This crank arm oscillates a small diameter shaft which extends out through the wall of the housing through a packing gland, usually made of Teflon to reduce friction to a minimum. The shaft connects to the pointer or control mechanism of the gauge and imparts the motion of the diaphragm thereto. Aside from the sealing problem, this construction presents the disadvantage that because of the high pressure against the shaft at the end in the diaphragm chamber, it is necessary to provide a thrust bearing at its opposite end to maintain the proper axial position of the shaft. This adds to the cost of the gauge and the difficulty of assembling it.

In another construction a crank arm is mounted in the diaphragm housing in contact with the diaphragm, and a thin-walled tube of reasonable length is attached at one end to the outside wall of the diaphragm housing, and is connected at its opposite end to a shaft which operates the indicator of the gauge. The inner end of the tube is connected to the crank arm. The rotary motion of the crank arm causes the tube to flex in torsion. This flex- ure rotates the shaft, thereby transmitting the motion of the diaphragm to the pointer. Another similar construction employs a long thin-walled tube which is preferably slightly bowed. This tube is closed at its outer end and attached at its inner end to the diaphragm housing. A rod or shaft, which is secured to the diaphragm, extends into this tube and exerts pressures on the tube in response to the motion of the diaphragm causing the tube to unbend. The motion of the tube is transmitted through a suitable mechanical linkage to the indicator of the gauge. This type gauge requires a long shaft member and is difficult to make in a compact design.

One object of the present invention is to provide an improved diaphragm-operated differential pressure gauge.

A further object of this invention is to provide an improved differential pressure gauge of the type described which can be constructed in a compact design, and which will be easy to assemble.

Another object of this invention is to provide a differential pressure gauge of the type described having an improved means for transmitting movement from the diaphragm to a pointer or control mechanism.

Another object of this invention is to provide a differential pressure gauge of the type described having an improved means for transmitting movement from the diaphragm to a pointer which can readily be sealed at the opening through which the transmitting means projects through the diaphragm housing.

A further object of this invention is to provide an improved differential pressure gauge wherein the internal friction of the motion-transmitting mechanism is reduced to a minimum.

A still further object of this invention is to provide an improved differential pressure gauge which is simple in construction, inexpensive to manufacture, and reliable in operation.

Other objects of this invention will become apparent from the specification, the drawing, and the appended claim.

Figure 2:
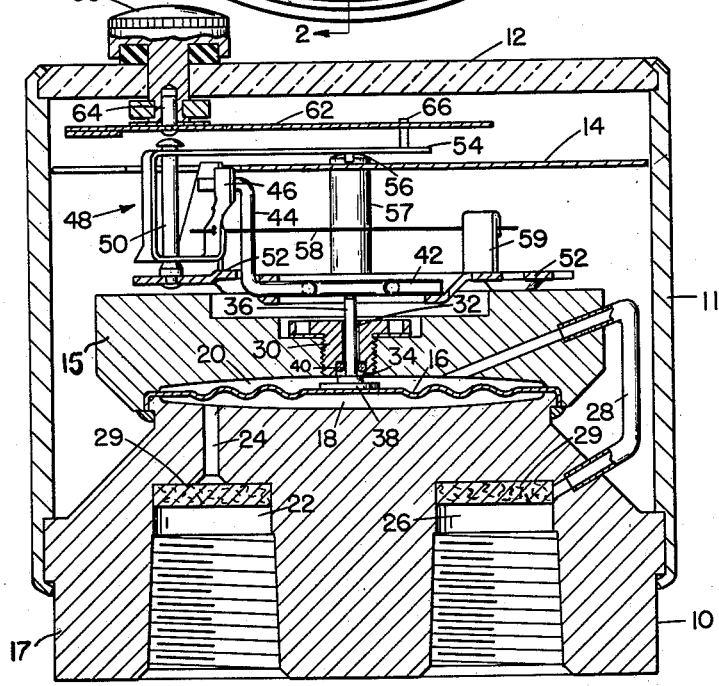

In the drawing:

FIG. 1 is a fragmentary plan view of a gauge constructed according to one embodiment of this invention; and FIG. 2 is a sectional view of this gauge taken at line 2—2 of FIG. 1 and looking in the direction of the arrows.

The gauge illustrated has a flexible diaphragm which is sealed around its periphery in the diaphragm housing. The fluids, whose differential in pressure is to be measured, are conducted to opposite sides of the diaphragm. A pin of relatively small diameter is attached to one side of the diaphragm and projects outwardly through an opening in the housing. The rectilinear movement of this pin imparts the motion of the diaphragm to a crank which is mounted outside the housing and which is connected to the indicator or pointer of the gauge to actuate the same. A resilient O-ring of relatively small size, which is mounted in a counterbore in the housing confronting the diaphragm, surrounds the pin. This O-ring tends to stretch as the pin moves up and down with change in pressure instead of sliding and rubbing on the pin, thus minimizing the effect of friction on the gauge indication.

Referring now to the drawing by numerals of reference, 10 denotes the diaphragm housing; and 11 is the gauge casing. The housing 10 is rigidly secured to and within the casing 11. Casing 11 is closed at one end by a glass 12 through which the graduations on a dial 14 are viewed. The housing 10 is made of two parts 15 and 17, which are so shaped as to form between them a chamber for the reception of the diaphragm. A flexible diaphragm 16 is secured around its periphery between the two parts of the housing, preferably by welding. The diaphragm is so mounted in the housing 10 that it defines chambers 18 and 20 in the housing at opposite sides of the diaphragm. The parts 15 and 17 of the housing act as upper and lower backing or stop plates for the diaphragm, limiting its movement.

The housing 10 is provided with a threaded socket 22 into which a suitable connection is threaded for conducting fluid from a high pressure source. The socket 22 is connected by a duct 24 with the chamber 18 to apply the high pressure fluid against the lower side of the diaphragm 16. Another threaded socket 26 is formed in the housing 10 into which a suitable connection is threaded for conducting fluid from a low pressure source. The socket 26 is connected by a duct 28 to the chamber 20 to apply the low pressure fluid against the upper side of the diaphragm 16. Conventional filters 29 are inserted in the two sockets 22 and 26 to prevent foreign material from entering chambers 18 and 20. A plug 30 is threaded into an opening in the housing 10 disposed centrally of the housing 10. The plug 30 has a central bore 32 of small diameter, and is formed with a counterbore 34 at its inner end. A pin 36 is attached to its inner end by its enlarged head 38 to the diaphragm 16. The pin 36 is slidably mounted in the bore 32. Surrounding the pin 36 in the counterbore 34 is a small O-ring 40 which acts as a seal to prevent leakage from the chamber 20 along the pin. The cross section area of the portion of the pin 36, which slides in bore 32 and O-ring 40 is preferably no greater than two tenths of the operating or active area of the diaphragm.

The counterbore 34, O-ring 40, and pin 36 are so proportioned that the O-ring fits snugly against both the periphery of the pin and the wall of the counterbore. It tends to grip both under pressure. It may be squeezed under the pressure so that it contacts around its periphery with the counterbore and around its bore with the pin and distorts as the pin moves. In any event, it acts as an effective seal against leakage along the pin, and because of its small size it does not have to be counterbalanced to offset its pressure area.

The outer end of the pin 36 engages against a crank arm 42. The crank arm has a right-angular extension 44 that engages one leg 46 of a U-shaped member 48. This member is mounted to pivot on a pin 50 that is secured in a plate 52 which is fastened in any suitable manner to the upper face of the housing 10. The crank 42 is rotatably journaled in bearings struck from the plate 52. The U-shaped member 48 has an indicating needle or pointer 54 formed integral therewith and extending at right angles to the axis of pin 50. This pointer 54 is adapted to read against graduations provided on the dial 14. Dial 14 is secured to the plate 52 by screws 56. Spacers 57, through which the screws 56 extend, position the dial 14 in the casing 11. The pointer 54 is normally held in its zero or null position by a spring wire 58, which is mounted at one end in a bracket 59 that is struck up from the plate 52 and which extends into a hole in one leg 46 of the U-shaped member 48.

A knob 60 is mounted in the glass 12 to be manually rotated to adjust a maximum indicating pointer 62 which is attached to the knob by a rivet 64. A lug 66 attached to the pointer 54 to move the pointer 62 to indicate the maximum reading position.

In use, a source of low pressure is attached by a suitable connection to the socket 26 and a source of high pressure is connected to the socket 22. The pressure differential operating through the pin 36 actuates the crank arm 42 which through U-shaped member 48 moves pointer 54 to indicate the differential in pressure.

In the gauge described, the total diaphragm motion required to operate the pointer through its whole range is extremely small. It is in the order of 0.015 to 0.020 inch while for other differential gauges motions of 0.125 to 0.250 inch are required, or more than ten times the motion required for the present gauge. With this extremely small motion the O-ring seal 40 tends to squeeze and move with the operating pin 36 with a change in pressure instead of sliding and rubbing as the pin moves up and back. This reduces the friction in the gauge to a minimum. Furthermore, with the extremely small O-ring seal used, the pressure area against the operating pin is relatively low for reasonably high pressures. For example, if the operating pin 36 has a diameter of 0.031 inch, the pressure area acting against the pin will be 0.00077 square inch. For a pressure of 100 p.s.i. on the diaphragm chamber a total force of 0.077 pound would be operating against the operating pin. This small pressure force against the operating pin makes it relatively easy to oppose this force by the pointer or control movement outside the pressure chamber. In measuring differential pressure with this gauge having a sealed diaphragm with a rectilinearly reciprocating sealed pin, the pressure area at the operating pin must be subtracted from the total pressure area of the diaphragm itself for a true differential pressure reading. If the diaphragm has approximately one inch outside diameter and a pressure area of approximately 0.375 square inch, the pressure force against the operating pin 36 described will be less than one-half of one percent of the total force against the operating diaphragm. This is negligible for most purposes. There is no need to balance the pressure force against the operating pin 36.

Thus, I have provided an improved differential pressure gauge which can be used for relatively high as well as low static pressures, which is subjected to relatively minor internal friction during movement of the diaphragm, and which is accurate without the necessity of balancing the pressure forces acting therein.

Also, I have provided a gauge which can be compactly designed without the inclusion of long shafts and bendable tubes, and which is simple in its construction, reliable in its operation and economical to manufacture.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claim.

Having thus described my invention, what I claim is:

A differential pressure gauge, comprising a casing, a housing mounted in said casing and having a chamber formed therein, a flexible diaphragm extending across said chamber and sealed around its perimeter in said housing to partition said chamber into two separate parts, means for conducting a fluid under pressure from one source into said chamber against one side of said diaphragm, a second means for conducting a fluid under pressure from a second source into said chamber against the other side of said diaphragm, a pin attached at said one side of said diaphragm and reciprocable rectilinearly through an opening in said housing through a limited distance no greater than .020 of an inch in either direction when said diaphragm flexes, resilient sealing means mounted in a circular counterbore in said housing which communicates with said opening, said sealing means surrounding and engaging said pin to seal against leakage from said chamber around said pin, said sealing means comprising a resilient, rubber-like O-ring having in its at-rest position resilient gripping engagement around its central hole with the outside of said pin and resilient grapping engagement around its periphery with said counterbore, whereby during rectilinear reciprocating movement of said pin through said limited distance said O-ring stretches but the inner and outer peripheral surfaces of said O-ring remain constantly in engagement with the peripheral surface of said pin and the sidewall of said counterbore, respectively, without any relative sliding taking place between said pin and said O-ring and between said O-ring and said counterbore, and an indicating means engaging said pin outside of said housing but within said casing to indicate the motion imparted to said pin by said diaphragm.

References Cited in the file of this patent

UNITED STATES PATENTS

| | | |
|---|---|---|
| 1,323,119 | Sundbaum | Nov. 25, 1919 |
| 2,138,152 | Grisdale | Nov. 29, 1938 |
| 2,360,731 | Smith | Oct. 17, 1944 |
| 2,367,087 | Beecher | Jan. 9, 1945 |
| 2,492,006 | Raybould | Dec. 20, 1949 |
| 2,494,598 | Waring | Jan. 17, 1950 |
| 2,612,908 | Tate et al. | Oct. 7, 1952 |
| 2,786,109 | Esken | Mar. 19, 1957 |
| 2,816,440 | Garrison | Dec. 17, 1957 |
| 2,819,615 | Colt | Jan. 14, 1958 |
| 2,841,674 | Bourns et al. | July 1, 1958 |
| 2,843,077 | Leefer | July 15, 1958 |
| 2,968,501 | Tisch | Jan. 17, 1961 |
| 3,031,200 | Hamer | Apr. 24, 1962 |